United States Patent
Kredo et al.

(10) Patent No.: US 6,182,045 B1
(45) Date of Patent: Jan. 30, 2001

(54) UNIVERSAL ACCESS TO AUDIO MAINTENANCE FOR IVR SYSTEMS USING INTERNET TECHNOLOGY

(75) Inventors: Thomas J. Kredo; Stephen Knight, both of Rochester, NY (US)

(73) Assignee: Nortel Networks Corporation, Montreal (CA)

(*) Notice: Under 35 U.S.C. 154(b), the term of this patent shall be extended for 0 days.

(21) Appl. No.: 09/184,375

(22) Filed: Nov. 2, 1998

(51) Int. Cl.[7] .................................................. G10L 15/00
(52) U.S. Cl. ..................... 704/270; 395/200.33; 379/67.1
(58) Field of Search .................................... 704/270, 275; 395/200.33; 379/67.1

(56) References Cited

U.S. PATENT DOCUMENTS

| | | |
|---|---|---|
| 5,732,216 | 3/1998 | Logan et al. .................... 395/200.33 |
| 5,884,262 * | 3/1999 | Wise et al. ............................ 704/270 |
| 5,978,648 * | 11/1999 | George et al. ....................... 434/362 |
| 5,999,525 * | 12/1999 | Krishnaswamy et al. ........... 370/352 |
| 6,006,191 * | 12/1999 | DiRienzo ................................ 705/2 |
| 6,022,315 * | 2/2000 | Iliff ...................................... 600/300 |

* cited by examiner

Primary Examiner—David R. Hudspeth
Assistant Examiner—Susan Wieland
(74) Attorney, Agent, or Firm—Hunton & Williams

(57) ABSTRACT

A network includes an administrative update station and an audio update station that are connected to a computer network, in particular, the World Wide Web. One or more IVR systems and one or more audio servers are likewise connected to the World Wide Web. The audio server holds the master address URL for the audio files. The IVRs access the Web in order to download updates of audio files. The audio files are administered through the Web by the administrative site and are updated through the Web by the audio update site.

11 Claims, 1 Drawing Sheet

UNIVERSAL ACCESS TO AUDIO MAINTENANCE FOR IVR SYSTEMS USING INTERNET TECHNOLOGY

Figure 1:
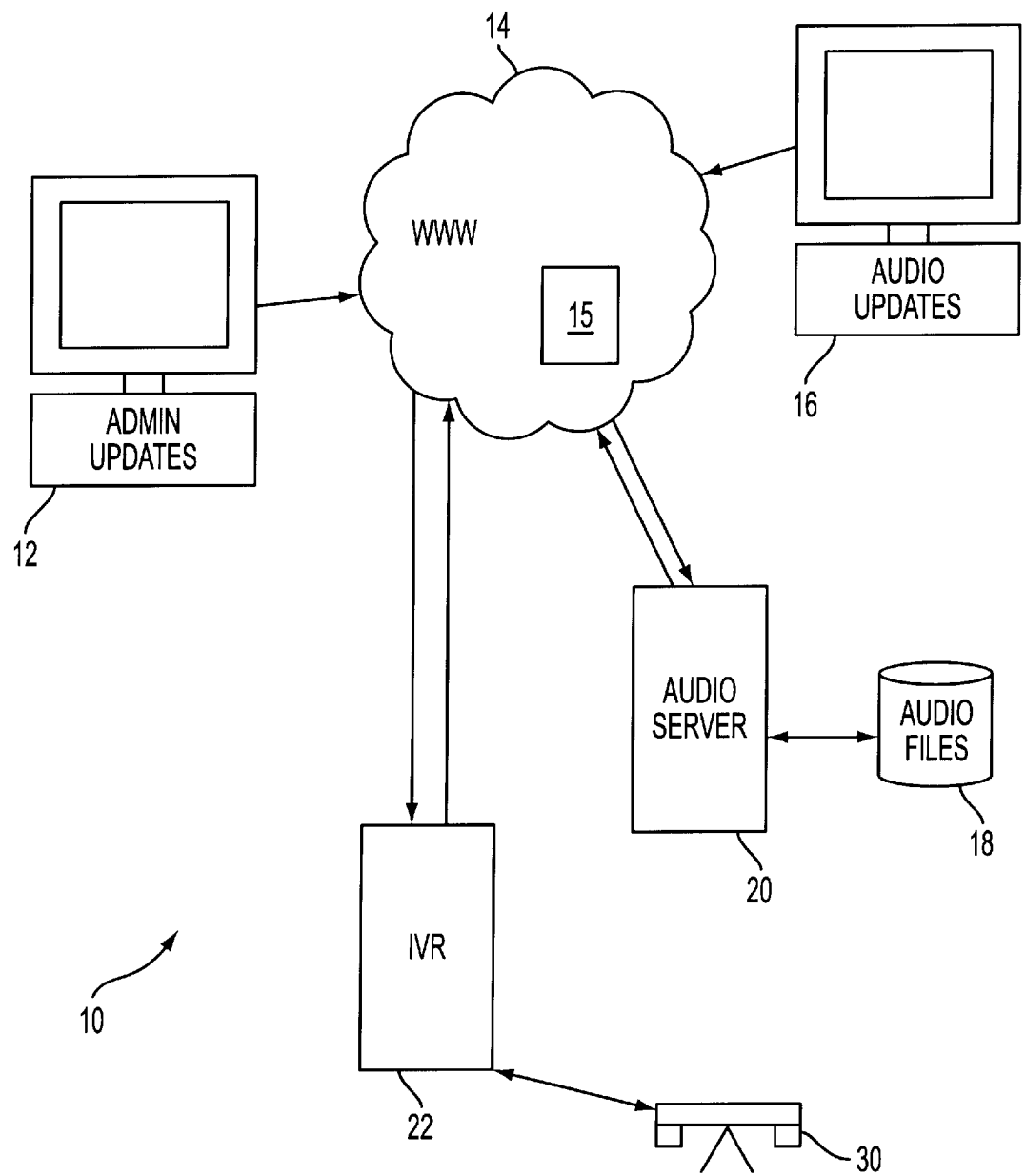

This invention relates in general to interactive voice recognition systems, and, in particular, to an apparatus and method for using Internet technology to maintain such systems.

BACKGROUND

Interactive voice recognition (IVR) systems are used by many telephone companies and other organizations for receiving and routing general calls. A typical IVR system presents the caller with audio announcements, typically for a menu of choices, and then asks the caller to select one of the menu choices. Over time the menu choices may change and so the operator of the IVR needs a system for updating audio announcements. At present, most IVR systems are proprietary systems and the methods for updating audio announcements are likewise proprietary.

For example, in order to change an audio file on an IVR server, local automated processes are developed to push the file from an administrative station to the multiple IVR servers. Such an updating operation entails multiple dial-up sessions between the administrative station and the IVR servers. These dial-up sessions are accompanied by automated file transfer protocol (FTP) processes that are also proprietary to the local implementation of the solutions. These solutions do not allow for universal access to the voice files.

More specifically, consider the ACMS/NAV application provided by Northern Telecom Limited. An update administrator uses an MAC based program called VDS to maintain the voice files. The program can add, delete and modify those voice files. The administrator dials up each ACMS/NAV node operations controller (OC) to transfer audio files. The administrator then establishes a Telnet session with the UNIX based OC processor and starts an update program. That program updates all the audio files for OCs connected to the local area network. The update administrator dials up multiple OCs when the ACMS/NAV applications span a large network. An alternative to this procedure is to provide the update transactions on a digital tape format that is installed manually on each OC. Both local alternatives are either time-consuming or inefficient, or both. Accordingly, there is a long-standing need for a system that will automatically maintain audio files on IVR systems.

SUMMARY OF THE INVENTION

The invention provides a universal access method and system for the maintenance of audio announcements. An administrator with a hypertext mark-up language (HTML) Web Browser can create and/or initiate an audio announcement update. Using the same web server, any number of IVR systems can update their audio announcements.

With this system and method, a single master universal resource location (URL) is programmed to be the focal point for audio announcements. A master file for all audio announcements is kept on a computer that is connected to a network, preferably the World Wide Web. Administrators and end-users use a Web Browser to add, delete or update audio files stored at the URL address. Each IVR system has a local area network connection to the World Wide Web that uses TCP/IP protocols. At programmed intervals, each IVR system accesses the URL to obtain the voice files that are specific to their application that have been updated since the last access.

The invention thus provides a method for managing IVR audio files. This method includes the steps of forming a network comprising a plurality of audio servers. Each audio server holds audio files in an addressable format and transfers one or more of those audio files to other computers on the network. A network site has an address that corresponds to the audio files held on the particular audio servers. Each IVR system has a LAN connection to the World Wide Web and can access the master audio URL address for downloading audio files from the master audio address.

An audio file administrator creates and edits audio files by accessing the audio file server via the World Wide Web. Upon accessing the audio server, the audio files are edited or added to and then uploaded to master address at the URL on the World Wide Web. At periodic intervals, one or more of the IVRs access the URL master address on the World Wide Web. During those intervals, the IVRs scan the designated audio file addresses to see if there have been any updates. If those files have been updated, then the updated files are downloaded either directly from the URL master address or through the World Wide Web via a connection between the audio server and the IVR.

DRAWING

FIG. 1 shows a network schematic drawing of the system.

DETAILED DESCRIPTION

A network 10 includes an administrative update station 12 and an audio update station 16 that are connected to a computer network, in particular, the World Wide Web 14. One or more IVR systems 22 and one or more audio servers 20 are likewise connected to the World Wide Web 14. The audio server 20 supports a web page that holds the master address URL for the audio files 18. The IVRs 22 access the Web 14 in order to download updates of audio files 18. The audio files 18 are administered through the Web 14 by the administrative site 12 and are updated through the Web 14 by the audio update site 16.

Each IVR system 22 includes a computer that is designed to handle voice telephone calls from telephone users 30. The IVR system receives telephone calls via ordinary, analog telephone lines, digital telephone lines or via Internet telephony. Each IVR 22 presents the caller 30 with an audio script that describes information and/or possible options for the caller. The caller is asked to respond by saying a number or giving a verbal response, such as "yes" or "no." A response can occur via a dual-tone, multi-frequency (DTMF) key.

The audio server 20 is a computer system that maintains, manages and stores audio for IVR systems 22. The server 20 includes at least one or more systems for communicating with other computers. The server 20 has a file transfer protocol (FTP) interface. This is a public communications and server protocol used for updating and downloading files from a server. The server 20 also contains an HTTP interface. This is another public communications and server protocol used for downloading files from a server. The server 20 may also include any other interface or mechanisms that permit one computer system to obtain files from another, as well as transfer files to another.

In the preferred embodiment of the invention, the communications network that links the elements 12, 16, 20 and 22 is the World Wide Web. Those skilled in the art will appreciate that other computer networks can be substituted for the World Wide Web. For example, network 14 could also be a local area network where communication traffic on the network is limited to a specific area and a limited number of communicating systems for a specific functionality. The network 14 could also be a wide area network where communication traffic is spread over a large geographic area and the communicating systems can support diverse number of functions. The local area network and the wide area network can also be private and/or public networks.

The inventive system and method provide a more efficient process for updating the audio server 20. An administrative update station 12 and an audio update station 16 can administer and edit audio files on server 20 by accessing a web page 15 that is maintained on the World Wide Web 14 by the server 20. The web pages will typically have a security check that will include at least user ID and a password. The user at update site 16 accesses a list of audio files that are used by the IVR system 20. The user can then download an audio file for a particular file name. The downloaded file can be created, recreated or updated by an update program from the update site 16. The audio file can be modified by the user using any of the generally available audio file editors that are well-known to those skilled in the art. An administrative user at site 20 is responsible for updating the list of audio update users 16 and their passwords, and the list of audio file names that are updateable. The web page 15 of audio server 20 provides a mechanism, such as JAVA code, that downloads the audio file to the audio server 20. The audio server 20 maintains the audio files in a web-addressable format, such as: http://www.update.announcementB.wav. The IVR system 22 can access the announcement files 18 periodically and store those files locally at IVR 22 or access those files real time depending upon its tolerance for network delays.

A typical update process is as follows. At a given time programmed by an update program in IVR 22, the IVR 22 requests an update of its audio files. The IVR 22 system contacts the audio server 20 and requests a list of new files to be downloaded or requests the first file to be downloaded. If the server 20 returns a list of files to be downloaded, then IVR 22 proceeds to request each file from server 20 and installs the file in a proper location in the IVR 22 until the download is complete. As an alternative, IVR 22 does not store the file locally but fetches the file from the audio server 20 in real time as needed. When server 22 returns the first file to be downloaded, the IVR installs that file 22 in a proper location and repeats the "request/receive" cycle using audio server 22 and the FTP or HTTP interface until there are no more files to be transferred or downloaded. As such, installing a new file can result in a new file on the IVR or in replacement of an existing file on the IVR. A request by the IVR for updates may include a date/time indicator for the audio server 20 so that the audio server 20 can determine the files for downloading to the IVR. In other words, the audio server 20 keeps a record of the downloads to the IVR 22. In that way, the audio server 20 only provides the most recent downloads to the IVR 22. The audio server 20 may maintain a list of files to be updated either as a constantly updated list as files are changed on the server 20 or may determine a list of files to be updated upon request.

Having thus described the salient features of the invention, those skilled in the art will appreciate that further modifications, changes, additions and deletions to the system in the process disclosed above may be made without departing from the spirit and scope of the invention as set forth in the following claims.

What is claimed is:

1. A method for managing interactive voice recognition audio files comprising the steps of:

connecting to a computer network a plurality of computers for maintaining and updating audio files that are played on a telephone network, said plurality of computers comprising a plurality of audio servers for holding audio files in an addressable format and for transferring one or more audio files to other computers on the network, a master audio address computer on the network for holding addresses corresponding to one or more audio file held on the audio servers, and a plurality of interactive voice recognition systems for addressing the master audio address computer and for downloading audio files from the master audio address;

accessing an audio server for the audio file by addressing the master audio address computer;

accessing the master audio computer;

scanning the master audio address computer for updated audio files;

identifying the audio files that have been updated; and downloading the audio files that have been updated from the audio server to an interactive voice recognition system over the computer network.

2. The method of claim 1 comprising the further steps of:

creating or editing an audio file; and uploading the audio file to the master address on the network.

3. A method for managing interactive voice recognition audio files comprising the steps of:

connecting to a computer network a plurality of computers for maintaining and updating audio files that are played on a telephone network, said plurality of computers comprising a plurality of audio servers for holding audio files in an addressable format and for transferring one or more audio files to other computers on the network, a master audio address computer on the network for holding addresses corresponding to one or more audio file held on the audio servers, and a plurality of interactive voice recognition systems for addressing the master audio address computer and for downloading audio files from the master audio address;

creating or editing an audio file;

accessing an audio server for the audio file by addressing the mater audio address computer;

uploading the audio file to the master address on the network;

accessing the master audio address computer;

scanning the master audio address computer for updated audio files;

identifying the audio files that have been updated; and downloading the audio files that have been updated from the audio server to an interactive voice recognition system over the computer network.

4. The method of claim 3 wherein the the step of scanning scans the master audio address computer at predetermined intervals.

5. The method of claim 3 wherein the interactive voice recognitions systems periodically downloads updated audio files.

6. The method of claim 3 wherein the interactive voice recognition systems request a list of updated audio files, the master address computer returns the requested lists, and the audio server transfers each of the updated files to the interactive voice recognition system via the computer network.

7. A system for managing interactive voice recognition audio files comprising:
 one or more audio generator computers for creating and editing audio files for interactive voice recognition systems;
 one or more audio servers for holding audio files in an addressable format and for transferring one or more audio files to other computers on the network,
 a master audio address computer on the network for holding addresses corresponding to one or more audio file held on the audio servers, and
 one or more interactive voice recognition systems for addressing the master audio address computer and for downloading audio files from the master audio address;
 a network for connecting together the audio generator computers, the audio server computers and the interactive voice recognition systems;
 a scanning module that scans the master audio address computer for updated audio files;
 an identifying module that identifies the audio files that have been updated; and
 means for transferring files among the computers on the network.

8. The system of claim 7 wherein the network comprises the Internet.

9. The system of claim 8 wherein the network comprises the World Wide Web.

10. The system of claim 8 wherein the audio server has one or more interfaces for receiving and for transferring files.

11. The system of claim 8 wherein the interfaces include one or more protocols selected from the group consisting of HTTP and FTP.

* * * * *